March 6, 1956 C. JELINEK, JR., ET AL 2,737,622

SYNCHRONOUS POWER SUPPLY APPARATUS FOR FACSIMILE SYSTEMS

Filed Feb. 21, 1950

INVENTORS
C. JELINEK JR.
A. A. STEINMETZ

BY A. A. Thomas
ATTORNEY

United States Patent Office 2,737,622

Patented Mar. 6, 1956

2,737,622

SYNCHRONOUS POWER SUPPLY APPARATUS FOR FACSIMILE SYSTEMS

Charles Jelinek, Jr., West Caldwell, N. J., and Alfred A. Steinmetz, North Yonkers, N. Y., assignors to The Western Union Telegraph Company, New York, N. Y., a corporation of New York Application February 21, 1950, Serial No. 145,482

5 Claims. (Cl. 321—49)

Figures 1, 2:
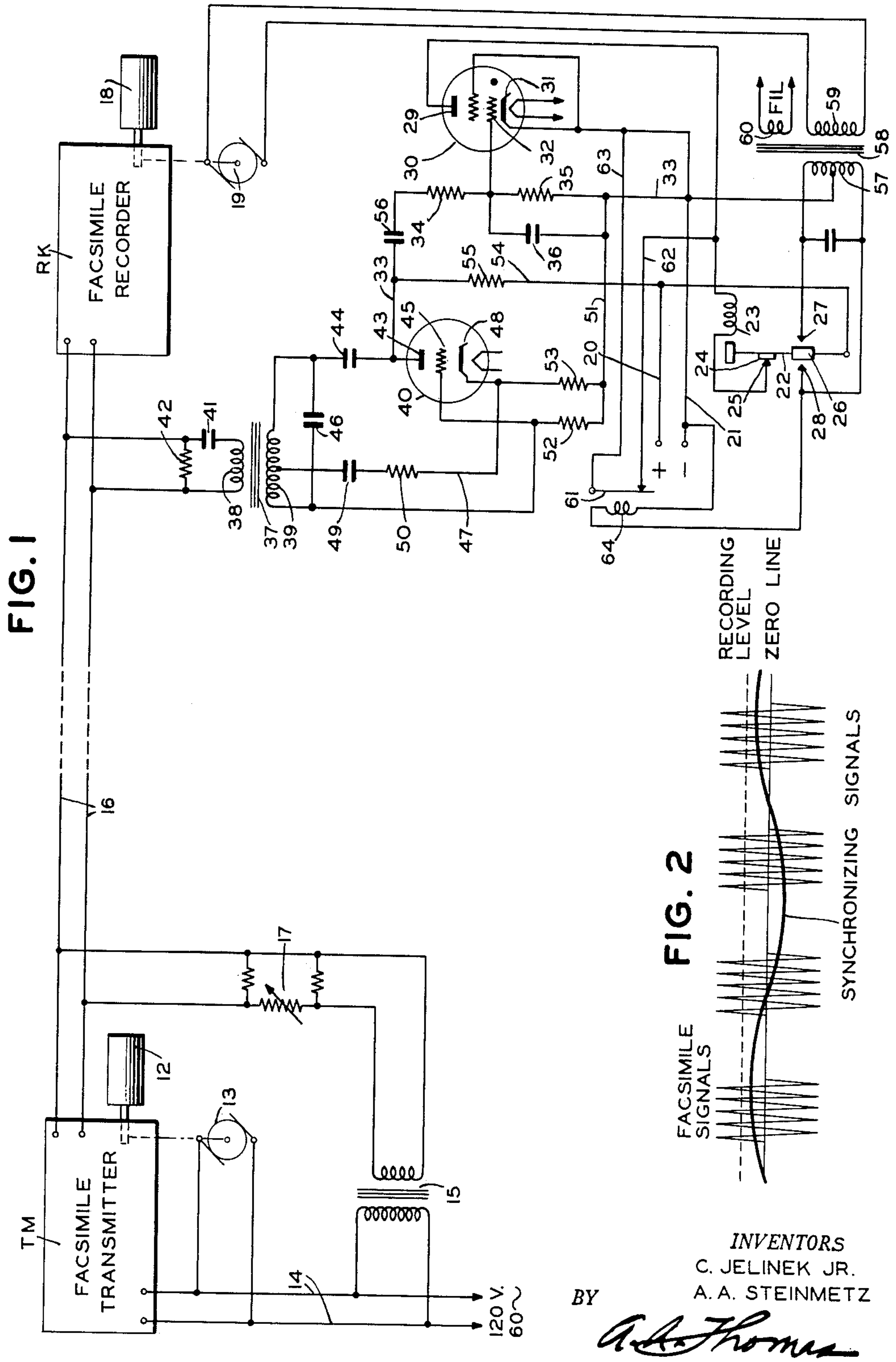

Our invention relates generally to electric systems where motors have to be synchronized, and its special object is to provide novel apparatus for synchronizing the facsimile equipments of two connected machines, one of which is powered by alternating current and the other by direct current. (For brevity we shall hereafter use the symbol A. C. for alternating current and D. C. for direct current.)

In facsimile telegraph systems between a central office operating on A. C. power and a number of distant transceivers in patrons' offices, it sometimes happens that a patron's machine is located in a district where only D. C. power is available. In such a case it is necessary to provide A. C. power from the D. C. source at the same frequency (usually 60 cycles per second) as the commercial A. C. power that runs the central office machine.

For this purpose we have devised a novel power supply unit of the vibrator type adapted to be controlled by the frequency of the A. C. power supply at the central office in such a manner that the two connected machines operate in exact synchronism. Briefly stated, the synchronous power unit of our invention comprises a vibrator reed with a natural frequency slightly above that of the A. C. power supply at the main office. The reed is driven by a coil which is energized from a D. C. source through a circuit including a thyratron and a contact on the reed in series with the coil. The A. C. synchronizing frequency put on the communication line at the main office controls the thyratron through a regenerative amplifier which provides a sharply tuned circuit for the synchronizing signals. The amplifier voltage is coupled to the control grid of the thyratron which is thereby caused to fire (i. e. become conductive) at the frequency of the synchronizing signals.

Every time the thyratron fires, the vibrator coil is energized by the full D. C. power and drives the reed in strict synchronism with the control signals from the main office. The vibrator reed also controls a transformer which produces an alternating current of the same frequency as the main office power supply, so that the two connected machines operate in unison. The amplitude of the synchronizing signals is kept below the recording level of the transmitted facsimile signals, so that the synchronizing signals do not interfere with the telegraphic operation of the system. This new power unit is a small device which can be built at low cost, requires no attention after installation, and is dependable in operation.

A practical embodiment of our invention is schematically represented in the drawings, where Fig. 1 illustrates a facsimile system employing our synchronizing power unit, and Fig. 2 is a signal wave diagram indicating roughly why the synchronizing signals do not interfere with the facsimile signals.

In describing Fig. 1 we shall assume that the machine TM is a facsimile transmitter at a main telegraph office and that the machine RK represents a patron's facsimile recorder adapted to be connected to the transmitter TM. However, in a two-way communication system the patron's machine is a transceiver which will not only record messages coming from a main office transmitter but will also transmit messages to a recorder at the main office. It will therefore be understood that when we refer to the machines TM and RK as a transmitter and a recorder, respectively, we include the reverse relationship. So, for convenience of description, we shall speak of TM as a facsimile transmitter located at a place where A. C. power is used, and RK is a recorder located where only D. C. power is availale.

The transmitter TM may be any practical form of machine capable of transmitting facsimile signals from a scanned copy. The scanning mechanism is represented schematically by a rotary drum 12 which is operated at a constant predetermined speed by a synchonous motor 13. The electric power for the transmitter comes from a local A. C. source indicated by a pair of bus bars 14 which may be assumed to supply current at the usual 120 volts and 60-cycle frequency. A step-down transformer 15 taps the bus bars 14 to supply a small amount of A. C. power to the communication line 16, which connects the transmitter TM with the patron's recorder RK. An adjustable pad 17 in the secondary circuit of transformer 15 permits regulation of the amount of A. C. power (which may be less than 6 volts) put on the line for synchronizing the recorder. Also, the pad 17 prevents the low-impedance secondary of transformer 15 from acting as a direct shunt across the transmitter.

The recorder RK may be of any practical construction to record the received facsimile signals. It is enough to say that the recording mechanism in this instance operates on a blank mounted on a rotary drum 18 which is driven by a synchonous motor 19. Broadly speaking, the motor 19 may operate any kind of facsimile recording device suitable for the system. The power for the recorder RK comes from a D. C. source represented by a pair of conductors 20 and 21, which will be designated for convenience as the positive and negative battery leads. It is necessary to derive 60-cycle A. C. power for the recording motor 19 from the battery leads 20—21, and that we accomplish by means of the novel power unit now to be described.

For the purpose of this description let us suppose that the frequency of the A. C. power supply 14 is 60 cycles per second, because that is the adopted standard for A. C. house current. However, it is to be understood that our invention is not limited to any particular frequency of the synchronizing signals derived from the A. C. source 14.

A vibrator reed 22 of spring metal is operated by an electromagnet represented schematically as a coil 23 which is energized from the D. C. source 20—21. The reed 22, which is permanently connected to the positive lead 20, carries a contact 24 arranged to engage a yieldable contact 25 when the reed is in normal or released position, as shown in Fig. 1. A second contact 26 is mounted on the reed between two contacts 27 and 28 which are normally spaced from the reed contact 26. When the coil 23 is energized, the reed 22 is pulled to the right (as viewed in Fig. 1), thereby breaking the contact 25 and closing the contact 27. Upon the de-energizing of coil 23, the released reed swings over to the left far enough to close not only contact 25 but also the contact 28.

The vibrator coil 23 is connected at one end to the contact 25 and at the other end to the plate or anode 29 of a thyratron 30, which is a gaseous tube well known in the electronic field and therefore requiring no description of its construction and principle of operation.

The tube 30 is represented here as a tetrode but it is intended to include any kind of thyratron adapted to control the vibrator coil 23. The cathode 31 of tube 30 is connected to the negative lead 21 and the control grid 32 is connected to a conductor 33 at a point between two resistors 34 and 35. The resistor 35 is shunted by a capacitor 36.

The circuit of coil 23 goes from the positive lead 20 through the reed operated contacts 24—25, and through the plate-cathode path of thyratron 30 to the negative lead 21. That is to say, the vibrator coil 23 is connected in series with reed contacts 24—25 and the thyratron 30, so that the coil is energized only when the contacts 24—25 are closed and when the thyratron fires. As will presently appear, this tube fires in exact synchronism with the 60-cycle frequency put on the line 16 at the central office.

A transformer 37 has a primary coil 38 connected to the communication line 16 and a secondary coil 39 connected to an amplifier tube 40. The circuit of primary coil 38 contains a capacitor 41 and a resistor 42. The capacitor 41 serves to partially tune the coil 38 to a 60-cycle frequency and also to block direct current which may flow in line 16. The resistor 42 serves to stabilize the operation of the amplifier circuit. One end of the secondary coil 39 is connected to the plate 43 of tube 40 through a blocking capacitor 44, and the other end of coil 39 goes to the grid 45 of tube 40. A tuning capacitor 46 is connected across the coil 39, and a conductor 47 connects the center of this coil to the cathode 48 of tube 40 through a capacitor 49 and a resistor 50. A conductor 51, which is connected to the negative battery lead 21, connects the grid 45 to wire 33 through a resistor 52, and the cathode 48 is connected to conductor 51 through a resistor 53. The positive battery lead 20 is connected by a conductor 54 to the plate 43 of tube 40 through a resistor 55. The plate 43 of tube 40 is connected to the grid 32 of thyratron 30 through the resistor 34 and a coupling capacitor 56.

The foregoing circuit connections cause the tube 40 to operate as a regenerative amplifier for the small 60-cycle signals that energize the line transformer 37. The values of capacitors 41 and 46 are so chosen that the transformer is sharply tuned to 60 cycles, so that the facsimile signals, which are transmitted on a carrier wave of higher frequency, are excluded from the transformer 37 and pass on to the recorder RK. The capacitors 44 and 49 feed back the amplified energy from tube 40 and also block all battery current from the transformer 37. The amplified energy of tube 40 is fed to the control grid 32 of thyratron 30 through capacitor 56 and resistor 34. The regenerative circuits of tube 40 not only provide the necessary high amplification for the weak synchronizing signals of 60-cycle frequency, but also filter out practically all the higher frequencies. Should any of these unwanted frequencies remain, they will be filtered out by the capacitor 36. The values of the various capacitors and resistors are so selected that the amplifier tube 40 will not oscillate.

It will be understood, then, that the low-level 60-cycle synchronizing signals taken from the line 16 by transformer 37 are cleared of the higher frequencies and amplified to the required high level by tube 40, which automatically passes the amplified energy to the control grid 32 of thyratron 30. It is only when the grid 32 receives a sufficient positive potential that the gas in the tube is ionized and becomes conductive to close the plate-cathode circuit. This voltage is impressed on grid 32 by the positive peaks of the 60-cycle signaling waves, so that the full energy of the D. C. power supply 20—21 passes through tube 30 and vibrator coil 23 at the frequency of the incoming signals.

The reed 22 is made to have a natural frequency of vibration slightly higher than the frequency of the synchronizing signals. Assuming the latter to have a frequency of 60 cycles per second, the reed has a natural vibration period of 61 or 62 cycles per second; or, say, roughly between 60.5 and 62.5 cycles. Due to the faster speed of the reed, the D. C. plate circuit of thyratron 30 through the closed reed contacts 24—25 and coil 23 will always be made before the firing voltage arrives on grid 32. This assures the operation of the vibrator reed 22 in exact synchronism with the 60-cycle signals sent over the transmission line 16. We shall have more to say about this slowing-down of the reed 22 to 60 cycles after describing how the reed is started at its natural frequency before the thyratron 30 fires.

The vibrator contacts 27 and 28 are connected to the primary coil 57 of a transformer 58, which has a main secondary coil 59 for energizing the synchronous motor 19 and another secondary coil 60 to provide heating current for the filaments of tubes 30 and 40. The middle of primary coil 57 is connected to the negative battery lead 21. As the reed 22 vibrates under thyratron control, it alternately closes the contacts 27 and 28, so that D. C. current goes alternately through the two halves of coil 57 at the rate of the synchronizing signals. Hence, the secondary coil 59 operates the recording motor 19 in unison with the distant transmitting motor 13.

Provision is made to start the vibrator reed 22 at its natural frequency before the thyratron 30 operates. A suitable timing device, shown here as a thermo-switch 61 by way of example, normally short-circuits the thyratron through shunt wires 62 and 63. A heater coil 64 for switch 61 is energized through the vibrator contacts 26, 27 and 28 as they alternately close and open. It takes a definite interval of time (say 8 or 10 seconds) for the switch 61 to open. This timed delay allows the filament of thyratron 30 to heat up the cathode 31 before the plate voltage is applied, so that no damage is done to the tube before it starts to operate. After the switch 61 opens, the heated coil 64 keeps it open and the circuit of vibrator coil 23 is controlled by the firing of the thyratron, which in turn is controlled by the incoming synchronizing signals. It is thus seen that the timing device 61 performs the double function of keeping voltage off the thyratron plate 29 before the cathode 31 is heated, and starting the reed 22 to vibrate at its natural frequency before the thyratron takes control of the reed.

As previously mentioned, the natural resonant speed of the vibrator reed 22 is slightly faster than the incoming signals that turn on the thyratron 30. After the timer switch 61 has opened, there is no energy in the driving coil 23 at the moment before the thyraton fires. Therefore, at this moment the reed 22 is in the process of slowing down and thereby keeps the contacts 24—25 closed until the thyratron fires upon arrival of the next synchronizing signal. Since the thyratron fires at the frequency of the incoming signals, the vibrator coil 23 is energized at the same frequency, so that the reed 22 can only vibrate in unison with the firing of the thyratrons. Consequently, the output of transformer 58 will be an alternating current for operating the recording motor 19 in synchronism with the low-level A. C. signals coming from the distant power supply 14.

Attention is called to the fact that if the synchronizing signals should be temporarily removed from the vibrator unit, as during switching operations, such signal interruption will not stop the reed 22, because the absence of a synchronizing frequency removes the bias from the thyratron grid 32 and permits the tube to fire whenever plate voltage is applied. Therefore, when no synchronizing signals are received, the coil 23 operates the reed 22 at its natural frequency through a circuit including the reed contacts 24—25 and the thyratron 30. It should be further noted that the opening of contacts 24—25 releases the driving power on the reed and causes the thyratron 30 to extinguish by removing its plate voltage at each cycle.

It will be seen from the preceding description that we have provided a power supply unit in the form of a simple, compact equipment in which a vibrator reed is controlled by a thyratron which in turn is controlled by synchronizing signals received from an A. C. power supply. The coil that drives the reed always receives the full amount of energy from the D. C. source through the thyratron which passes only the full current, so that the reed always operates with certainty at the frequency of the received signals.

While we have shown and described a preferred embodiment of our invention, as used in facsimile systems, our synchronizing apparatus is applicable in other systems where it is necessary to synchronize one motor with another under the conditions set forth. It is evident that various changes and modifications can be made within the scope of the appended claims.

We claim as our invention:

1. In a synchronizing system, a source of incoming synchronizing signals of a certain frequency, a source of D. C. power supply, an electromagnet connected to said power supply, a vibrator reed mounted to be attracted by said electromagnet and having contacts in circuit with the electromagnet for periodically interrupting the energizing circuit of the electromagnet, said vibrator reed having a natural period of vibration slightly higher than the frequency of said signals, means including a thyratron having an anode, cathode and a starting electrode, with its anode-cathode circuit connected to said D. C. power supply and in circuit with said electromagnet and interrupter contacts, means for applying said synchronizing signals to said starting electrode to fire the thyratron and energize said electromagnet to slow down the vibrator reed to synchronism with said signals, and an inverter circuit connected to said D. C. power supply and including reversing contacts controlled by the synchronous vibrations of said reed to provide alternating current of the same frequency as said signals.

2. In a synchronizing system, a source of incoming synchronizing signals of a certain frequency, a source of D. C. power supply, an electromagnet connected to said power supply, a vibrator reed mounted to be attracted by said electromagnet and having contacts in circuit with the electromagnet for periodically interrupting the energizing circuit of the electromagnet, said vibrator reed having a natural frequency of vibration slightly higher than said signal frequency, a thyratron having an anode, cathode and a starting eelctrode, with its anode-cathode circuit connected in series with said electromagnet and interrupter contacts, an automatic timer for energizing said electromagnet independently of said thyratron for a certain interval to drive said reed at its natural speed before voltage from said D. C. source is applied to the thyratron anode, means for heating the thyratron cathode during said timed interval to place the thyratron in operative condition, means for applying said received signals to said starting electrode to fire the conditioned thyratron at the signal frequency to cause the thyratron to control the energized periods of said electromagnet and slow down the vibrations of the reed to the frequency of said signals, and an inverter circuit connected to said D. C. power supply and including reversing contacts controlled by the synchronous vibrations of said reed to provide alternating current of the same frequency as said signals.

3. In a synchronizing system, a source of incoming synchronizing signals of a certain frequency, a circuit tuned to said frequency and connected to receive the synchronizing signals, means for amplifying said signals, a source of D. C. power supply a thyratron having an anode, cathode and grid, with its anode circuit connected to said power supply, a vibrator electromagnet connected in said anode circuit, a reed mounted to be attracted by said electromagnet, said vibrator reed having a natural frequency of vibration slightly above the frequency of said signals, a normally closed contact mounted on the reed and connected in series with said electromagnet and the anode-cathode circuit of the thyratron, means for impressing the said amplified signals at ionizing voltage on the grid of said thyratron to cause the thyratron to fire through a circuit including said closed reed contact and said electromagnet in series so that the electromagnet is energized by the signal-controlled firing of the thyratron to drive the reed at the frequency of said signals, an inverter circuit connected to said D. C. power supply and including reversing contacts actuated by the synchronizing vibrations of said reed, and a transformer circuit controlled by said reversing contacts and operative to provide alternating current of the same frequency as said signals.

4. In a communication system, a source of incoming A. C. synchronizing signals, a source of D. C. power supply, and synchronizing apparatus controlled by said A. C. signals for supplying from said D. C. source an alternating current of the same frequency as said A. C. signals, said apparatus comprising a vibrator electromagnet connected to said D. C. power supply, a vibrator reed mounted to be attracted by said electromagnet and having contacts in circuit with the electromagnet for periodically interrupting the energizing circuit of the electromagnet, said vibrator reed having a natural frequency of vibration slightly higher than the frequency of said synchronizing signals, means for energizing said electromagnet to start said reed vibrating at its natural frequency, a thyratron having an anode, cathode and grid, with its anode circuit connected in series with said electromagnet and interrupter contacts, an amplifier having an anode, cathode and grid, with its anode-cathode circuit energized by said D. C. power, means for applying said signals to the grid of said amplifier, means for impressing the output of said amplifier on the grid of said thyratron to cause it to fire at the frequency of said signals, means including said vibrator contacts operative at the natural frequency of vibration of the reed to send the full energy of said D. C. power supply through said electromagnet and cause it to vibrate the reed in synchronism with the signal-controlled firing of the thyratron, and an inverter circuit connected to said D. C. power supply and including reversing contacts controlled by the synchronously vibrating reed to produce an alternating current of the same frequency as said A. C. synchronizing signals.

5. In a facsimile system, a source of incoming A. C. synchronizing signals at a voltage below a predetermined recording level of the system, a transformer connected to said source, a circuit tuned to the frequency of said signals and coupled to the output of said transformer, an amplifier tube having an anode, cathode and grid, means for applying the signals in said tuned circuit to said grid of the amplifier tube, a thyratron having an anode, cathode and grid, means for applying the amplified output of the amplifier tube to the grid of the thyratron to cause the thyratron to fire at the frequency of said signals, a source of D. C. power supply, a vibrator electromagnet connected in series with the anode-cathode circuit of the thyratron and said D. C. source and energized from the D. C. source each time the thyratron fires, a reed mounted to be attracted by said electromagnet and having contacts in circuit with the electromagnet for periodically interrupting the energizing circuit of the electromagnet, said reed having a natural frequency of vibration slightly higher than the frequency of said synchronizing signals, said interrupter contacts being operative upon closure when the reed is vibrating at its natural frequency to complete the anode circuit of the thyratron and place the thyratron in a condition of readiness to fire upon the appearance of each synchronizing signal at the grid of the thyratron, and an inverter circuit connected to said D. C. power supply and including reversing contacts controlled by the synchronously vibrating reed to provide alternating current of the same frequency as said A. C. synchronizing signals.

References Cited in the file of this patent

UNITED STATES PATENTS

| | | |
|---|---|---|
| 1,977,256 | Swart | Oct. 16, 1934 |
| 2,234,919 | Ressler | Mar. 11, 1941 |
| 2,290,231 | Finch et al. | July 21, 1942 |
| 2,292,630 | Garstang | Aug. 11, 1942 |
| 2,304,702 | Myers | Dec. 8, 1942 |
| 2,394,436 | Frech | Feb. 5, 1946 |

FOREIGN PATENTS

| | | |
|---|---|---|
| 290,298 | Great Britain | May 13, 1927 |